United States Patent [19]

Fukunaga et al.

[11] Patent Number: 4,705,130
[45] Date of Patent: Nov. 10, 1987

[54] METHOD OF CONTROLLING VEHICLE

[75] Inventors: Yukio Fukunaga, Zushi; Yasuji Shibahata; Kenji Nakamura, both of Yokohama; Yasumasa Tsubota, Yokosuka; Namio Irie; Junsuke Kuroki, both of Yokohama, all of Japan

[73] Assignee: Nissan Motor Co., Ltd., Yokohama, Japan

[21] Appl. No.: 695,228

[22] Filed: Jan. 28, 1985

[30] Foreign Application Priority Data

Jan. 31, 1984 [JP] Japan .................. 59-15336

[51] Int. Cl.⁴ .................. B62D 5/04; B62D 5/06
[52] U.S. Cl. .................. 180/140; 180/141; 180/142; 180/143; 280/91
[58] Field of Search .......... 180/141, 140, 142, 143, 180/79, 79.1; 280/91; 364/424; 74/388 PS

[56] References Cited

U.S. PATENT DOCUMENTS

| | | | |
|---|---|---|---|
| 4,047,728 | 9/1977 | Takahashi et al. | 180/141 |
| 4,105,086 | 8/1978 | Ishii et al. | 180/79 |
| 4,412,594 | 11/1983 | Furukawa et al. | 180/142 X |
| 4,418,780 | 12/1983 | Ito et al. | 180/142 |
| 4,441,572 | 4/1984 | Ito et al. | 180/143 X |
| 4,476,529 | 10/1984 | Nakamura et al. | 180/142 X |
| 4,593,358 | 6/1986 | Takeshima et al. | 180/142 X |

FOREIGN PATENT DOCUMENTS

| | | |
|---|---|---|
| 0071909 | 2/1983 | European Pat. Off. |
| 0089512 | 9/1983 | European Pat. Off. |
| 2851773 | 4/1980 | Fed. Rep. of Germany |
| 3124181 | 1/1983 | Fed. Rep. of Germany |
| 79754 | 6/1980 | Japan .................. 180/142 |
| 814496 | 6/1959 | United Kingdom |
| 885108 | 12/1961 | United Kingdom |
| 1332979 | 10/1973 | United Kingdom |
| 1411829 | 10/1975 | United Kingdom |
| 1424937 | 2/1976 | United Kingdom |
| 1449245 | 9/1976 | United Kingdom |
| 1451906 | 10/1976 | United Kingdom |
| 1468045 | 3/1977 | United Kingdom |
| 2021057A | 11/1979 | United Kingdom |
| 2035931A | 6/1980 | United Kingdom |
| 2083422A | 3/1982 | United Kingdom |

Primary Examiner—John J. Love
Assistant Examiner—Mitchell J. Hill
Attorney, Agent, or Firm—Leydig, Voit & Mayer

[57] ABSTRACT

A method of controlling an automotive vehicle is disclosed whereby a steering characteristic of the vehicle is automatically adjustable to a feature of the driver's steering the vehicle. The feature of the driver's steering the vehicle is detected in terms of a driver's technique or habit in manipulating a steering wheel or a motion characteristic of the vehicle such as a yaw rate or a lateral acceleration resulting from a driver's manipulating the steering wheel. A pair of steerable road wheels, such as a pair of front road wheels, are steered through an angle which is proportioned to an angle through which the steering wheel is manually turned at a ratio which is variable with variation in the feature of the driver's steering the vehicle.

10 Claims, 8 Drawing Figures

FIG.7

METHOD OF CONTROLLING VEHICLE

BACKGROUND OF THE INVENTION

The present invention relates to a method of controlling a vehicle having a steering wheel and road wheels including a pair of road wheels steerable by turning the steering wheel. More particularly, the present invention relates to a motion control method of an automotive vehicle.

U.S. Pat. No. 4,418,780, issued to Hideo ITO et al. on June 12, 1983 and assigned to Nissan Motor Company Limited to which the present application has been assigned, discloses a method of steering an automotive vehicle for the purpose of improving manoeuverability thereof. According to this known method, a pair of rear wheels are steered such that the ratio of a steered angle of the rear wheels to a steered angle of a pair of front wheels is kept at such a value as to maintain an angle of sideslip at a minimal value, thereby to provide high degree of control and stability. The ratio is determined by the vehicle speed, the vehicle weight exerted to each of the front and rear axles, and the steered angle of the pair of front wheels which are always steered by a steering wheel.

Figure 1:
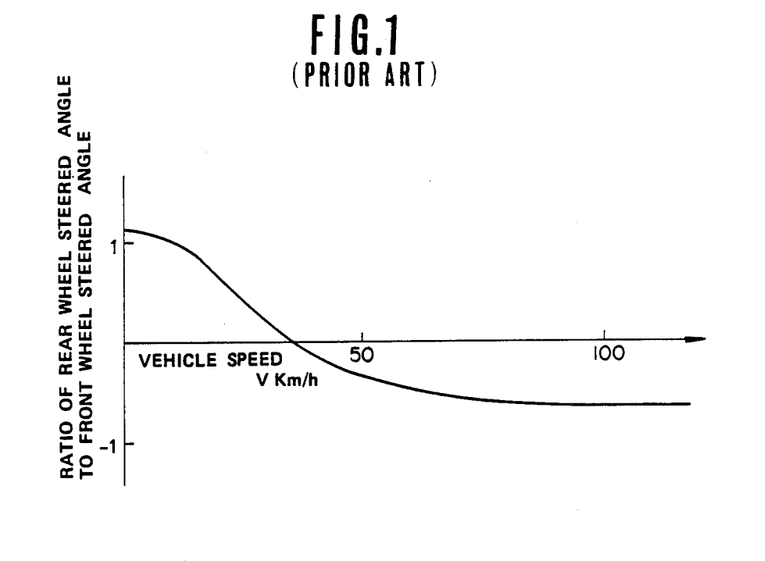
FIG. 1 is a graph showing the before mentioned characteristic curve given by the known method discussed before.

However, since the front wheels are steered through an angle which is proportioned to an angle through which the steering wheel is manually turned at a ratio which is a constant for a given turned angle of the steering wheel, whereas the rear wheels are steered through an angle which is proportioned to the steered angle of the front wheels at a ratio which varies in response to the vehicle speed, the known method gives a characteristic curve as shown in FIG. 1 that at low vehicle speeds, the rear wheels are steered in the opposite direction, while, at high vehicle speeds, the rear wheels are steered in the same direction as the front wheels are steered. Although, according to this known method, the vehicle can be steered with excellent control and stability at any vehicle speed, those skilled in the art have encountered a problem that is attributed to the fact that the steering characteristic of the front wheels and thus that of the rear wheels are fixed and determined by predetermined functions, respectively, regardless of a difference in driver's habit or technique in steering the vehicle. The problem is that it is impossible to vary the control characteristics of a vehicle with a variation in a driver's habit or technique in manipulating a steering wheel or his taste in control response of the vehicle to the manipulation of the steering wheel. Manufacturing various different types of vehicles which fit well with different driver's tastes would require a large fleet of vehicles with many different specifications, thus raising manufacturing cost of each unit. If the same driver continues to use the same vehicle, the above mentioned solution will work. But, it will not do so if the same vehicle is used by different drivers having different tastes.

SUMMARY OF THE INVENTION

According to the present invention, there is provided a method of controlling a vehicle having a steering wheel and road wheels including a pair of predetermined road wheels steerable by turning the steering wheel, comprising:

extracting a feature of a driver's steering of the vehicle and generating a feature indicative signal indicative of the feature extracted:

controlling a steered angle of the predetermined road wheels relative to a turned angle of the steering wheel at a ratio; and varying said ratio of the steered angle of the pair of predetermined road wheel to the turned angle of the steering wheel in response to said feature indicative signal.

An object of the present invention, therefore, is to improve a method of controlling a vehicle having a steering wheel and road wheels such that the control characteristics of the vehicle are automatically adjustable to a feature of a driver's steering of the vehicle.

DETAILED DESCRIPTION OF THE INVENTION

Hereinafter, the invention is described referring to the accompanying drawings.

Figure 2:
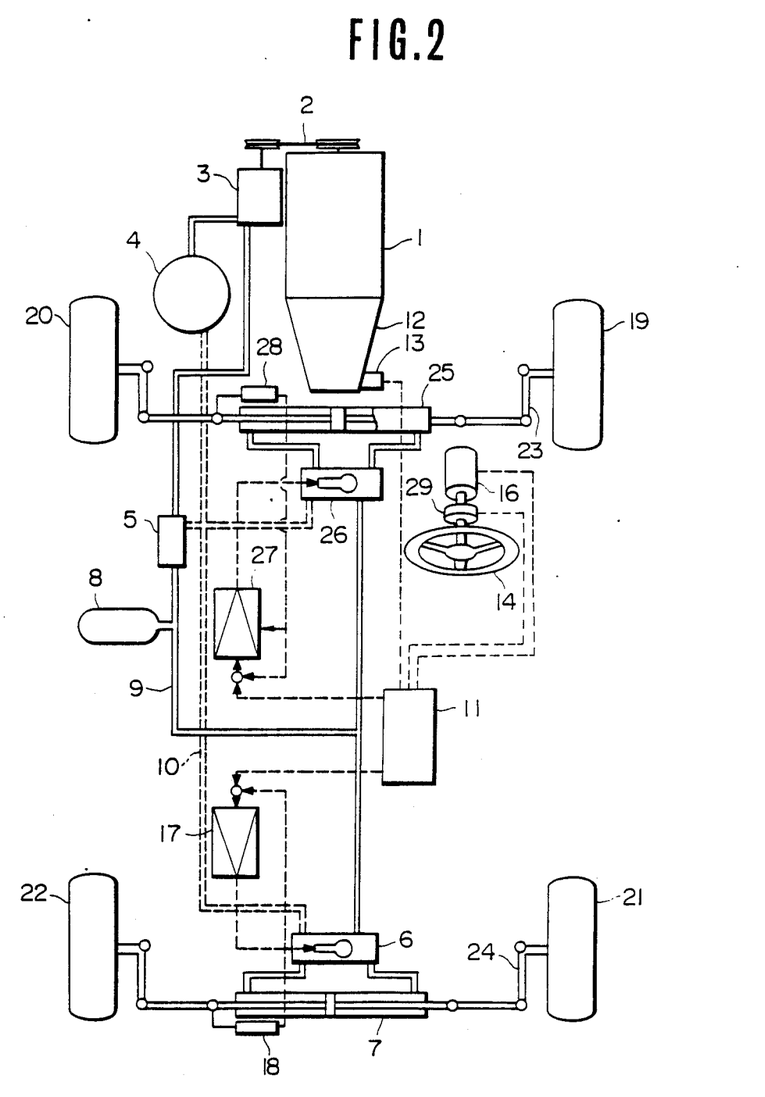
FIG. 2 is a schematic diagram showing a first embodiment.

There is shown in FIG. 2 a schematic diagram illustrating a first embodiment embodying the present invention. In this first embodiment, a pair of front wheels are steered through an angle which is proportioned to an angle through which a steering wheel is manually turned at a ratio which is variable with a variation in a feature of a driver's technique in manipulating or turning a steering wheel of the automotive vehicle. In other words, the ratio of the steered angle of the pair of front wheels to the turned angle of the steering wheel is variable in response to a feature of a driver's technique in manipulating the steering wheel. Another feature is that a pair of rear wheels are steered through an angle which is proportional to the steered angle of the pair of front wheels at a ratio which is variable in response to vehicle speed. Describing in detail, the rear wheels are steered in a manner described in the before discussed U.S. Pat. No. 4,418,780 which is been hereby incorporated by reference in its entirety.

Referring to FIG. 2, an engine 1 drives via a belt pully transmission unit 2 an oil pump 3 which delivers an oil from a reservoir tank 4 via an unloading valve 5 to a servo valve 6. The servo valve 6 supplies hydraulic fluid pressure to a left and a right fluid pressure chamber of a hydraulic fluid pressure actuator 7 for actuating the rear wheels. Designated by the reference numeral 8 is an accumulator. Designated by the reference numeral 9 is an actuating fluid supplying line, and designated by the reference numeral 10 is a fluid return line to the reservoir tank 4. Designated by the reference numeral 11 is an electronic control circuit which is fed with a signal from a vehicle speed sensor 13 mounted to a transmission 12 and a signal from a steering wheel angle detector 16 attached to a steering column for a steering wheel 14. The control circuit 11 is electrically connected with a servo amplifier 17 which electrically actuates the servo valve 6 in accordance with an output signal from the control circuit 11. Designated by the reference numeral 18 is a displacement detector which detects a displacement of the steering linkage indicative of a steered angle of the rear wheels 21 and 22. An output signal from this detector 18 is electrically connected with the servo amplifier 17 to feed back information regarding the steered angle of the rear wheels 21 and 22. Designated by the reference numerals 19 and 20 are front wheels, designated by the reference numerals 21 and 22 are the rear wheels, and designated by the reference numerals 23 and 24 are steering linkages for the front and rear wheels, respectively. For the front wheels 19 and 20, too, a hydraulic fluid pressure actuator 25 for actuating the front wheels, which is similar, in construction, to the hydraulic fluid pressure actuator 7 for the rear wheels, is connected to actuate the front wheel steering linkage 23, and a front wheel steering servo valve 26 is connected with an actuating hydraulic fluid feed and return lines 9 and 10 in parallel with the rear wheel steering servo valve 6. With the servo valve 26, hydraulic fluid is supplied to a right and a left fluid pressure chamber of the hydraulic fluid pressure actuator 25 so as to actuate the front wheels 19 and 20. Designated by the reference numeral 29 is a steering wheel angular speed sensor which detects an angular speed of the steering wheel 14 when it is turned. The sensor output indicative of the angular speed detected is fed to the control circuit 11. Although, in this embodiment there are provided a steering wheel angle detector 16 and a steering wheel angular speed sensor 29, the steering wheel angular speed sensor 29 may be omitted if a differential circuit is included in the control circuit, i.e., a means for generating a time derivative indicative signal, 11 which differentiates the electric signal generated by the steering wheel angle detector 16.

As is apparent from the above description, according to the present embodiment, a steering wheel angular speed is detected as a variable to be processed to determine a feature of a driver's steering of the vehicle. Further description is made along with a control block diagram shown in FIG. 3.

Figure 3:
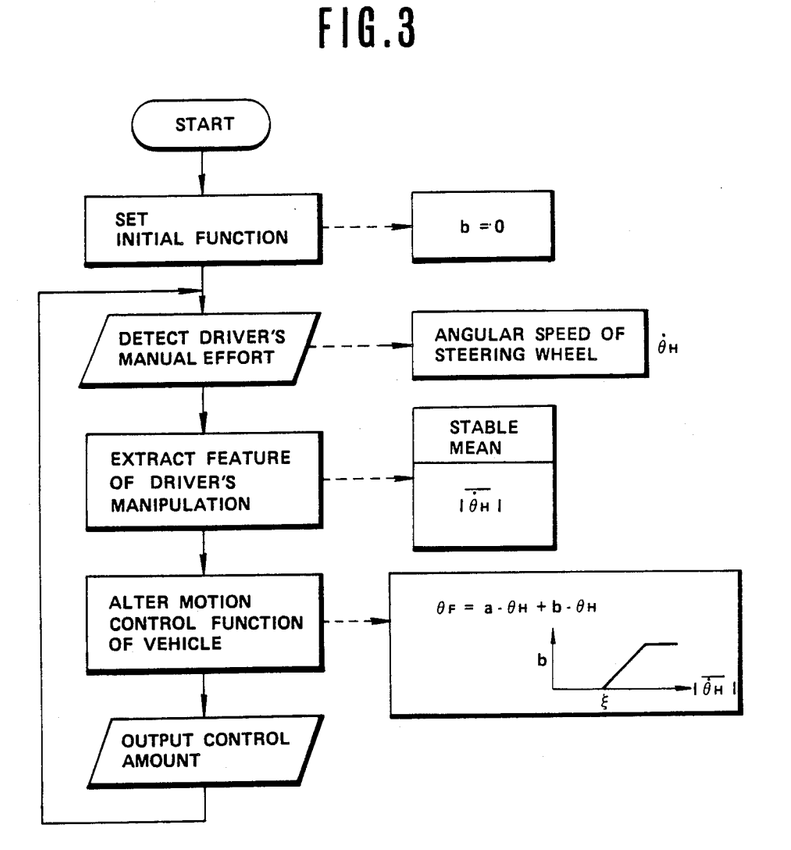
FIG. 3 is a control block diagram for the first embodiment.

Let it be assumed now that a turned angle of a steering wheel is $\theta_H$, a steered angle $\theta_F$ of the front wheels for this steering wheel turned angle $\theta_H$ is expressed by the following equation, $$\theta_F = a \cdot \dot{\theta}_H + b \cdot \theta_H \quad (1),$$

where: a represents a gear ratio of a steering gear, and b represents a constant proportional to a steering wheel angular speed $\dot{\theta}_H$ although b=0 is set as an initial value. When the initial value zero is set as b, i.e., by b=0, the front wheel steered angle $\theta_F$ varies in proportion to the steering wheel turned angle $\theta_H$, in other words, the front wheels are steered in accordance with variation in the steering gear ratio like the conventional steering system. Needless to say, the coefficients a and b shall not be limited to the above mentioned values and may be subject to variations according to the design choice.

After the vehicle has started to run, the steering wheel angular speed sensor 29 determining the time derivative of the turned angle $\dot{\theta}_H$ of the steering wheel by detecting the steering wheel angular speed $\dot{\theta}_H$, i.e., more particularly, speed at which the steering wheel 14 is turned to the left or right, and generates time derivative indicative signals which are fed to the control circuit 11, sequentially.

The control circuit 11, determines the stable means of the steering wheel angular speed which is sequentially fed thereto so as to extract the value of the stable mean as representing a feature of the driver's technique in steering the vehicle. The reason why the stable mean is used is to eliminate from the sequential data obtained, such as an influence due to the the steering wheel being frequently turned so as to negotiate road conditions, in extracting the feature of the driver's technique in manipulating the steering wheel in steering the vehicle. However, it is possible to use the running mean instead of the stable mean.

Let it now be assumed that the stable mean at a sampling time is given by $|\dot{\theta}_H|$ and the value $\overline{|\dot{\theta}_H|}$ is greater than a certain valve. The control circuit 11 varies the value b in proportion to the value $|\dot{\theta}_H|$ and varies the control signal fed to the servo amplifier 27 so as to cause the front wheel steered angle $\theta_F$ to be increased by the value $b \cdot \dot{\theta}_H$ as shown in FIG. 3.

As shown in FIG. 2, there is mounted to the hydraulic fluid pressure actuator 25 a displacement detecting mechanism 28 which forms a closed loop position control system by feeding back the output signal thereof to the servo amplifier 27.

In the manner described above, it is possible to increase the steering gain of the steering system by increasing the steered angle of the front wheels in accordance with the feature extracted using the stable mean at various sampling times.

As shown in FIG. 3, when $\overline{|\dot{\theta}_H|}$ is greater than a certain value, it is better to keep the value b constant. This is attributed to the fact that if the value b is increased as $\overline{|\dot{\theta}_H|}$ increases beyond a certain value, the steered angle of the front wheels becomes excessively large for the turned angle of the steering wheel.

Figure 4:
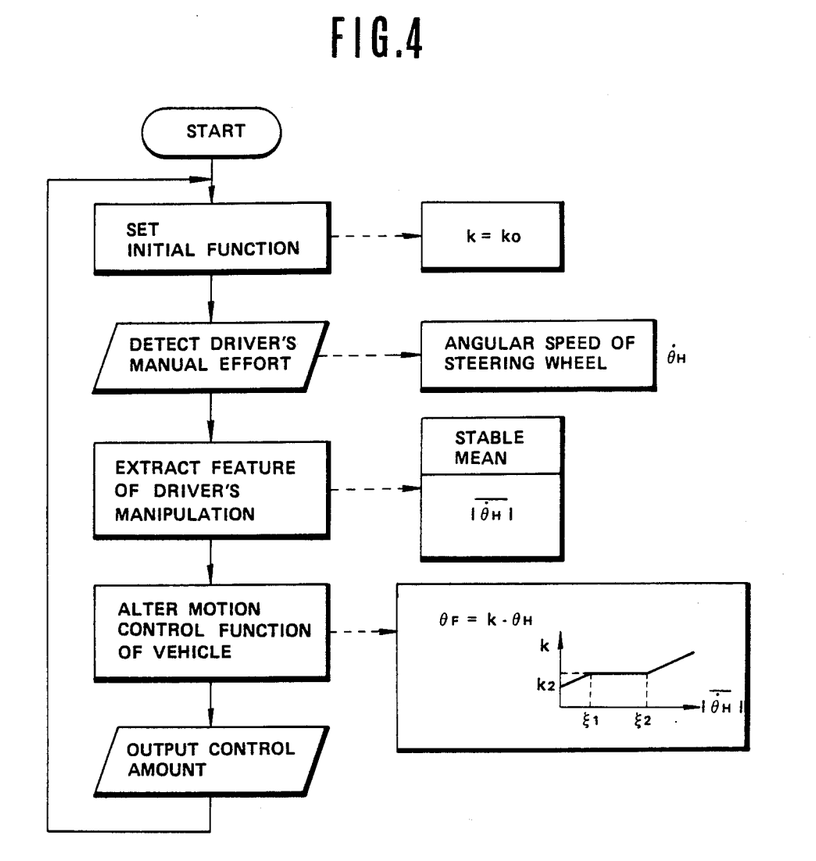
FIG. 4 is a control block diagram for a second embodiment.

Referring to FIG. 4, a second embodiment is described.

FIG. 4 shows a block diagram of operation sequence of the second embodiment. This second embodiment is different from the first embodiment in that the equation (1) has been replaced with an equation (2) as follows wherein a front wheel steered angle $\theta_F$ is made proportional to a steering wheel turned angle $\theta_H$ $$\theta_F = k \cdot \theta_H \quad (2)$$

In this equation, when the stable mean $\overline{|\dot{\theta}_H|}$ falls in the range between $\xi_1$ and $\xi_2$ ($\xi_1$ is less than $\xi_2$), the coefficient k is set equal to a constant $k_0$ ($k=k_0$), when $|\dot{\theta}_H| > \xi_2$, the steering gain, i.e., the ratio of steered angle $\theta_F$ for the front wheels to turned angle $\theta_H$ of the steering wheel, is set large, whereas, when $\overline{|\dot{\theta}_H|} < \xi_1$, the ratio is set small. With this setting, tastes of a wide range of drivers ranging from a driver who wants a quick control response to a driver who does not want such a quick response can be satisfied.

Figure 5:
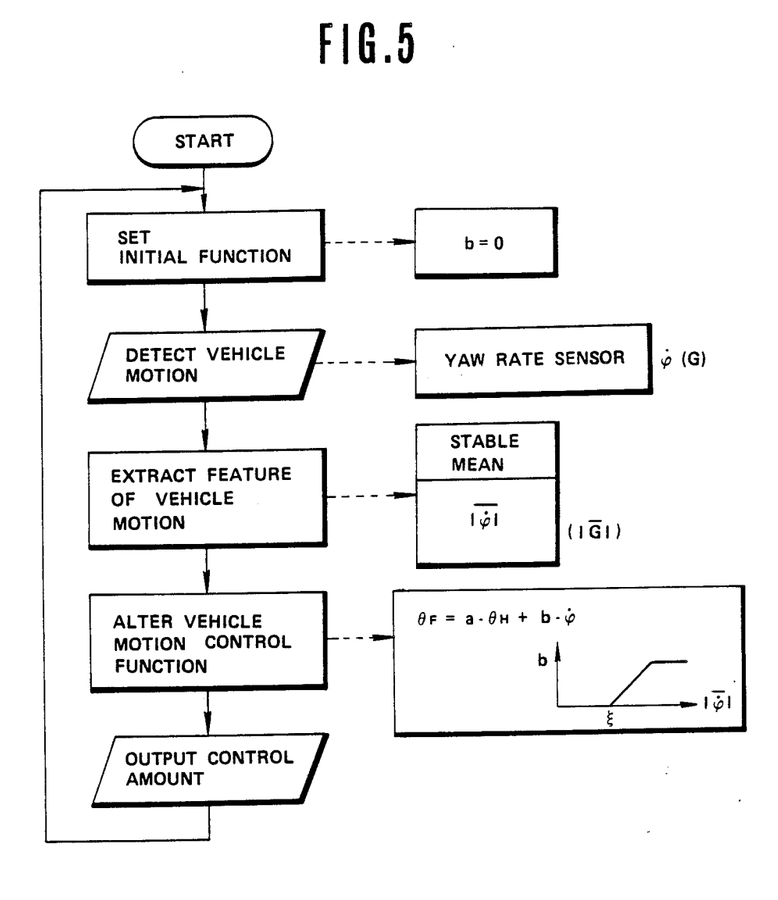
FIG. 5 is a control block diagram for a third embodiment.
Figure 6:
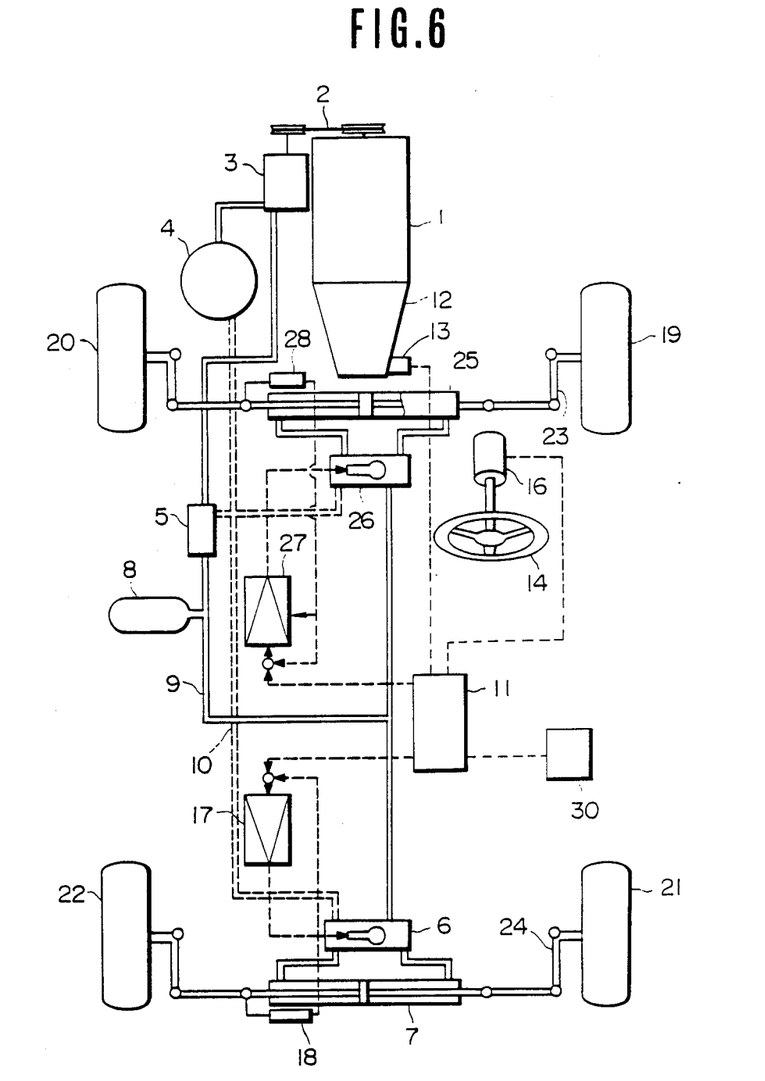
FIG. 6 is a schematic diagram of the third embodiment employing the control block shown in FIG. 5.

Referring to FIGS. 5 and 6, a third embodiment is described.

In the third embodiment whose control block diagram is shown in FIG. 5, a characteristic motion of an automotive vehicle resulting from a driver's manipulating steering wheel is detected in terms of a yaw rate $\dot{\psi}$ or a lateral acceleration G instead of the steering wheel angular speed $\dot{\theta}_H$ in determining the feature of a driver's steering of the vehicle. Thus, as shown in FIG. 6, in this embodiment, a yaw rate sensor or an acceleration sensor 30 is provided instead of the steering wheel angular speed sensor as used in the first and the second embodiment, and feeds its output signal to a control circuit 11. The control circuit 11 extracts a feature in the motion of a vehicle by performing a predetermined arithmetic operation and causes an increase in the front wheel steered angle $\theta_F$ by an amount $b \cdot \dot{\psi}$ or $b \cdot G$ in proportion to $\overline{|\dot{\psi}|}$ or $\overline{|G|}$. Since, in this embodiment, the motion of the vehicle is directly extracted, the characteristic in motion of the vehicle can always adjust well to the feature of the driver in steering the vehicle regardless of variation in specification of the vehicle due to aging of the component parts.

In the above mentioned embodiments, the control circuit is reset after engine is stopped and it is set and extracts the driver's vehicle steering feature after the engine is started. However, a considerable time taken to extract the driver's vehicle steering feature causes a problem when the same driver uses the same vehicle because the arithmetric operation has to be performed from scratch each time after the engine start-up.

Figure 7:
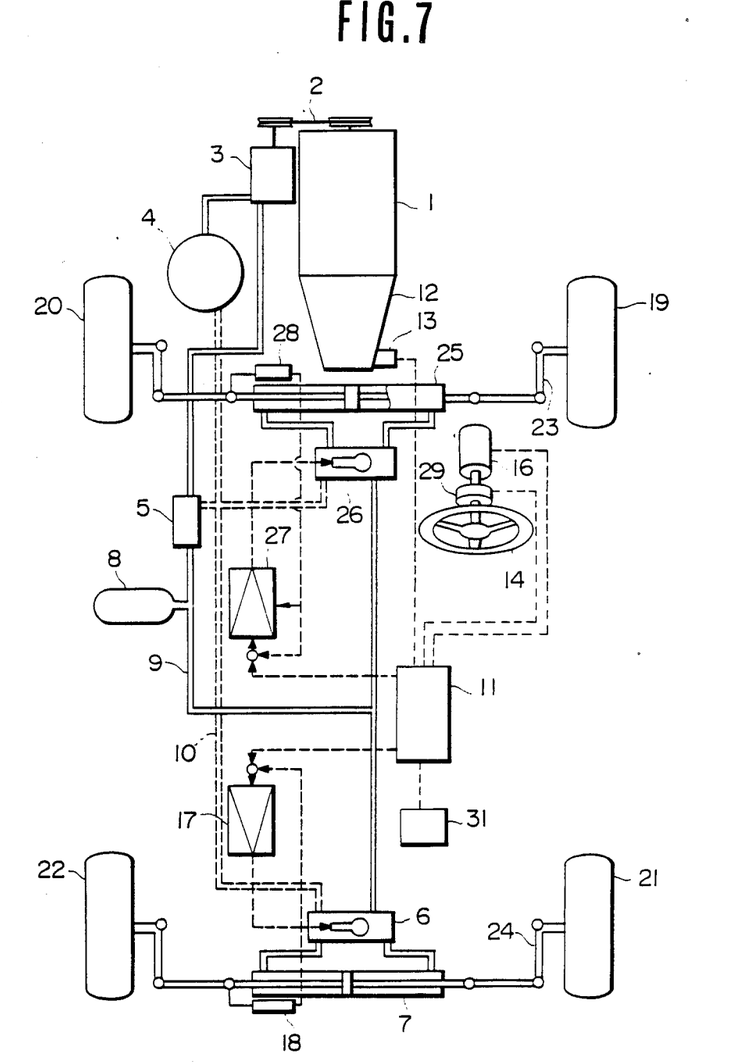
FIG. 7 is a schematic diagram showing a fourth embodiment.

To cope with this problem, according to the fourth embodiment shown in FIG. 7, a memory 31 including a nonvolatile memory is connected with a control circuit 11 so as to store a value representing a driver's vehicle steering feature. Needless to say, this feature is applicable to the second and third embodiments.

Figure 8:
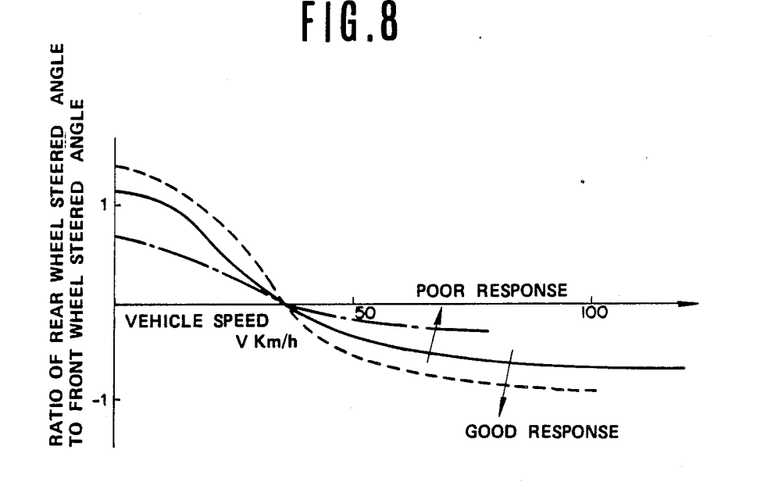
FIG. 8 is a graph showing two different characteristic curves given by the present invention as compared to the characteristic curve given by the before discussed known method.

In the above described embodiments, the ratio of the steered angle of the front wheels to the turned angle of the steering wheel is increased in accordance with the driver's technique in manipulating the steering wheel or the motion characteristics of the vehicle, but it is possible that the ratio of the steered angle of the rear wheels to the turned angle of the steering wheel may be increased or decreased in accordance with the driver's feature in steering the steering wheel or the motion characteristic of the vehicle. The result is illustrated in FIG. 8 where a fully drawn characteristic curve expresses a case where the before mentioned known method of steering four wheels of a vehicle is used, a broken line characteristic curve expresses a case where the steering gain of the rear wheels is increased by using the method according to the present invention so as to increase the control response of the vehicle, and a phantom line characteristic curve expresses a case where the steering gain of the rear wheels is slightly decreased so as to lower the control response of the vehicle.

As described above, according to the present invention, the driver's technique in steering a steering wheel or the motion characteristic of the vehicle resulting from the driver's technique in steering is extracted and the control characteristics of the vehicle can be varied to fit to the driver's steering habit or technique or the taste of the driver regarding the response of the vehicle. A change in the control characteristics of the vehicle due to imbalance in air pressure between vehicle tires, an increase/decrease in number of vehicle occupants can be compensated for, thus providing an unchanged vehicle control characteristics.

The present invention is not limited to the above described embodiments and many modifications are possible within the scope of claim. For example, the rear wheel steering characteristic can be controllably varied or the present invention may be applied to a vehicle whose front wheels only are steerable.

What is claimed is:

1. A method of controlling a vehicle having a steering wheel and road wheels including a predetermined pair of road wheels steerable at a steered angle by turning the steering wheel to a turned angle, said method comprising the steps of:
   extracting a feature averaged over time indicative of a driver's technique steering the vehicle and generating a feature indicative signal indicative of the feature extracted;
   controlling the steered angle of the predetermined pair of road wheels relative to the turned angle of the steering wheel at a predetermined ratio; and
   varying said predetermined ratio of the steered angle of the predetermined pair of road wheels to the turned angle of the steering wheel in response to the feature indicative signal.

2. A method as claimed in claim 1, wherein said feature extracting step comprises:
   detecting the turned angle of the steering wheel and generating a turned angle indicative signal;
   determining a time derivative of the turned angle of the steering wheel and generating a time derivative indicative signal; and
   determining the stable mean of said time derivative indicative signal and generating said stable mean as said feature indicative signal.

3. A method as claimed in claim 2 wherein said determining a time derivative step includes detecting the time derivative of the turned angle of the steering wheel.

4. A method as claimed in claim 1 wherein said feature extracting step comprises:
   detecting a yaw rate of the vehicle and generating a yaw rate indicative signal; and
   determining the stable mean of said yaw rate indicative signal and generating said stable mean as said feature indicative signal.

5. A method as claimed in claim 1 wherein said feature extracting step comprises:
   detecting a lateral acceleration of the vehicle and generating a lateral acceleration indicative signal; and
   determining the stable mean of said lateral acceleration indicative signal and generating said stable mean as said feature indicative signal.

6. A method as claimed in claim 4 wherein said varying step comprises computing the following equation $$\theta_H = a \cdot \theta_H + b \cdot \dot{\psi}$$

where:

$$b = f(\overline{|\dot{\psi}|})$$

$\theta_F$ = the steered angle of the predetermined pair of road wheels,
$\theta_H$ = the turned angle of the steering wheel, and
$\dot{\psi}$ = the yaw rate.

7. A method as claimed in claim 5 wherein said varying step comprises computing the following equation $$\theta_F = a \cdot \theta_H + b \cdot G$$

where:

$$b = f(|\overline{G}|),$$

$\theta_F$ = the steered angle of the predetermined pair of road wheels,
$\theta_H$ = the turned angle of the steering wheel, and
G = the lateral acceleration.

8. A method as claimed in claim 1 wherein said feature indicative signal is stored in a memory.

9. A method of controlling a vehicle having a steering wheel and road wheels including a predetermined pair of road wheels steerable at a steered angle by turning the steering wheel to a turned angle, said method comprising the steps of:

extracting a feature averaged over time indicative of a driver's technique of steering the vehicle and generating a feature indicative signal indicative of the feature extracted;

controlling the steered angle of the predetermined pair of road wheels relative to the turned angle of the steering wheel at a predetermined ratio; and varying said predetermined ratio of the steered angle of the predetermined pair of road wheels to the turned angle of the steering wheel in response to the feature indicative signal, said varying step comprising computing the following equation $$\theta_F = \theta_H + b \dot{\theta}_H$$

where:
a = a gear ratio of the steering gear where:

$$b = [f(|\overline{\dot{\theta}}|)]f(|\overline{\theta_H}|)$$

$\theta_F$ = the steered angle of the pair of predetermined road wheels, and
$\theta_H$ = the turned angle of the steering wheel.

10. A method of controlling a vehicle having a steering wheel and road wheels including a predetermined pair of road wheels steerable at a steered angle by turning the steering wheel to a turned angle, said method comprising the steps of:

extracting a feature averaged over time indicative of a driver's technique of steering the vehicle and generating a feature indicative signal indicative of the feature extracted;

controlling the steered angle of the predetermined pair of road wheels relative to the turned angle of the steering wheel at a predetermined ratio; and varying said predetermined ratio of the steered angle of the predetermined pair of road wheels to the turned angle of the steering wheel in response to the feature indicative signal, said varying step comprising computing the following equation $$\theta_F = k \cdot \dot{\theta}_H$$

where:

$$k = f(|\overline{\theta_H}|),$$

$\theta_F$ = the steered angle of the predetermined pair of road wheels, and
$\theta_H$ = the turned angle of the steering wheels.

* * * * *